(12) United States Patent
Lin

(10) Patent No.: US 6,497,738 B2
(45) Date of Patent: Dec. 24, 2002

(54) FILTER FOR INDOOR BARBECUE

(76) Inventor: Yu-Yuan Lin, #72-1 Shin-Lo Road, Tainan (TW), 702

(*) Notice: Subject to any disclaimer, the term of this patent is extended or adjusted under 35 U.S.C. 154(b) by 0 days.

(21) Appl. No.: 09/757,787

(22) Filed: Jan. 10, 2001

(65) Prior Publication Data
US 2002/0088211 A1 Jul. 11, 2002

(51) Int. Cl.$^7$ .............................................. F24C 15/20
(52) U.S. Cl. ............................ 55/385.1; 55/DIG. 36; 99/337; 99/403; 99/408; 126/299 D; 126/299 E; 126/299 R
(58) Field of Search .......................... 55/385.1, 385.2, 55/DIG. 36; 99/337, 403, 408; 126/299 D, 299 E, 299 R; 169/65

(56) References Cited

U.S. PATENT DOCUMENTS

| | | | |
|---|---|---|---|
| 3,487,199 A | | 12/1969 | Hamlin |
| 3,766,844 A | * | 10/1973 | Donnelly et al. ............ 454/238 |
| 3,890,124 A | * | 6/1975 | Howes .................. 55/DIG. 36 |
| 3,943,837 A | | 3/1976 | Trkla |
| 3,956,979 A | | 5/1976 | Coroneos |
| 4,158,992 A | | 6/1979 | Malafouris |
| 4,291,668 A | * | 9/1981 | Moeller ................. 126/299 R |
| 4,428,758 A | * | 1/1984 | Montierth .............. 55/DIG. 30 |
| 4,663,517 A | | 5/1987 | Huff et al. |
| 4,827,903 A | | 5/1989 | Kim |
| 4,865,864 A | * | 9/1989 | Rijswijck .................... 426/520 |
| 5,140,896 A | | 8/1992 | Duran |
| 5,148,737 A | * | 9/1992 | Poulson ...................... 99/327 |
| 5,195,425 A | | 3/1993 | Koziol |
| 5,203,316 A | | 4/1993 | Pritchett |
| 5,297,534 A | | 3/1994 | Louden |
| 5,367,950 A | | 11/1994 | Sarich |
| 5,404,801 A | | 4/1995 | Holland |
| 5,536,518 A | | 7/1996 | Rummel |
| 5,649,475 A | | 7/1997 | Murphy et al. |
| 5,719,377 A | | 2/1998 | Giebel et al. |
| 5,752,433 A | | 5/1998 | Charlson et al. |
| 5,782,168 A | | 7/1998 | Krhnak |
| 5,801,357 A | | 9/1998 | Danen |
| 5,845,562 A | | 12/1998 | Deni et al. |
| 5,848,567 A | | 12/1998 | Chiang |
| 5,934,180 A | | 8/1999 | Lin |
| D423,280 S | | 4/2000 | Lin |

OTHER PUBLICATIONS

US 5,159,161, 10/1992, Rogers et al. (withdrawn)*

* cited by examiner

Primary Examiner—David A. Simmons
Assistant Examiner—Minh-Chau T. Pham
(74) Attorney, Agent, or Firm—Dilworth & Barrese, LLP

(57) ABSTRACT

A stand-alone filtering apparatus for use with indoor barbecuing includes a base configured for the reception of a heating assembly and a filter unit which is selectively positionable in a vertical direction relative to the base. The filter unit includes a filtering element for removing contaminants from a medium as the medium passes therethrough and a ventilation system for creating an air flow for drawing the medium and the contaminants through the filtering element.

18 Claims, 6 Drawing Sheets

FILTER FOR INDOOR BARBECUE

BACKGROUND

1. Field of the Disclosure

The present disclosure relates generally to smoke filters and more particularly to a free-standing, smoke and fume filtering device for use in connection with indoor grills and rotisseries.

2. Description of the Related Art

Outdoor charcoal or gas barbecuing is a popular method of cooking and preparing various foods such as meats, poultry, fish and vegetables and manufacturers have enjoyed great commercial success providing outdoor barbecues and accessories in the United States and elsewhere. Part of the popularity of outdoor barbecuing can be attributed to the unique blend of smell, flavor and look the briquettes convey to the meat, fish, and/or vegetables which is often referred to as "barbecue", "smoke" or "charcoal" flavor. However, due to the obvious safety concerns of burning briquettes indoors, barbecuing has typically been recognized as an outdoor cooking activity.

Recently, however, manufacturers have been looking for ways to manufacture grills for barbecuing indoors which imitate the various cooking advantages of outdoor barbecues, e.g., the smell, taste and look of barbecued food. For example, electric indoor barbecues provide one method of safely barbecuing indoors and some of these designs include electric hotplates with grill-like surfaces for conveying a grill-like look to the food and for allowing the fat/grease to drip from the food onto the heating element to flavor and/or "smoke" the food.

However, since the amount of dripping fat differs among various food types, e.g., chicken versus sausage, the amount of smoke emanating from the heating elements is often difficult to control which can quickly spoil the charm of indoor barbeque grilling. Moreover and especially with indoor grilling, the smoke and/or fumes emanating off the heating elements should be filtered prior to introduction into the surrounding area. As a result and due to the convenience of other cooking methods and appliances such as ovens and stoves which offer a wider range of cooking options, e.g., baking, broiling, frying, etc., indoor barbecuing is not commonplace.

U.S. Pat. No. 5,404,801 to Holland discloses an outdoor barbecue unit which includes a replaceable filtration element for removing contaminants from the smoke as the smoke exits a smoke exhaust cylinder mounted atop the barbecue hood. U.S. Pat. No. 4,827,903 to Kim discloses a table mounted cooker which includes a filter which removes contaminants from the smoke exhaust as the smoke exhaust is drawn through a chimney or ventilation system. Movement of the filter relative to the cooking surface is limited to removal of the filter from the unit, i.e., the filter is not positionable relative to the cooking surface.

As can be appreciated, these units are somewhat complicated and may not be suitable for ordinary indoor use. Moreover, separate ventilation systems or exhaust connections may be required which, again, are typically not suitable for ordinary indoor use. Thus, there exists a need to develop a simple, smoke filtering system which can be easily and readily adapted for use with a variety of indoor grills.

SUMMARY

The present disclosure relates to a stand-alone filtering apparatus for use during indoor barbecuing which includes a base configured for the reception of a heating assembly, e.g., a grill plate and/or a rotisserie. Preferably, the filter unit is selectively positionable in a vertical direction relative to the base and includes a filtering element for removing contaminants from a medium, e.g., smoke or fumes, as the smoke and fumes pass therethrough. The filter unit also includes a ventilation system configured to draw the smoke and contaminants through the filtering element prior to dispersing the exhaust into the surrounding environment. The filtering element is preferably selectively removable for cleaning and/or replacement purposes.

In one embodiment, the base includes a post which extends upwardly therefrom and the filter unit includes a sleeve which telescopically engages to the post. A pair of opposing locking tabs may be associated with the post or the sleeve to allow a user to selectively position the filter unit in a desired vertical position relative to the base. Preferably, the filter unit includes a hinge which permits pivotable movement of the filter unit relative to the base. The base and post may also be connected by a hinge or pivot element to allow the base to pivot relative to the post for storage purposes.

In another embodiment, the base includes a frame-like support rack which is configured to support the grill and/or the rotisserie below the filter unit. Preferably, the filter unit includes a motor which operates at least one fan for creating an air flow to draw the smoke and contaminants through the filtering element prior to dispersing the same into the surrounding atmosphere. The motor may include a switch to regulate the speed of the fan and the resulting air flow of the smoke and contaminants through the filtering element.

DETAILED DESCRIPTION OF THE PREFERRED EMBODIMENTS

Figure 1:
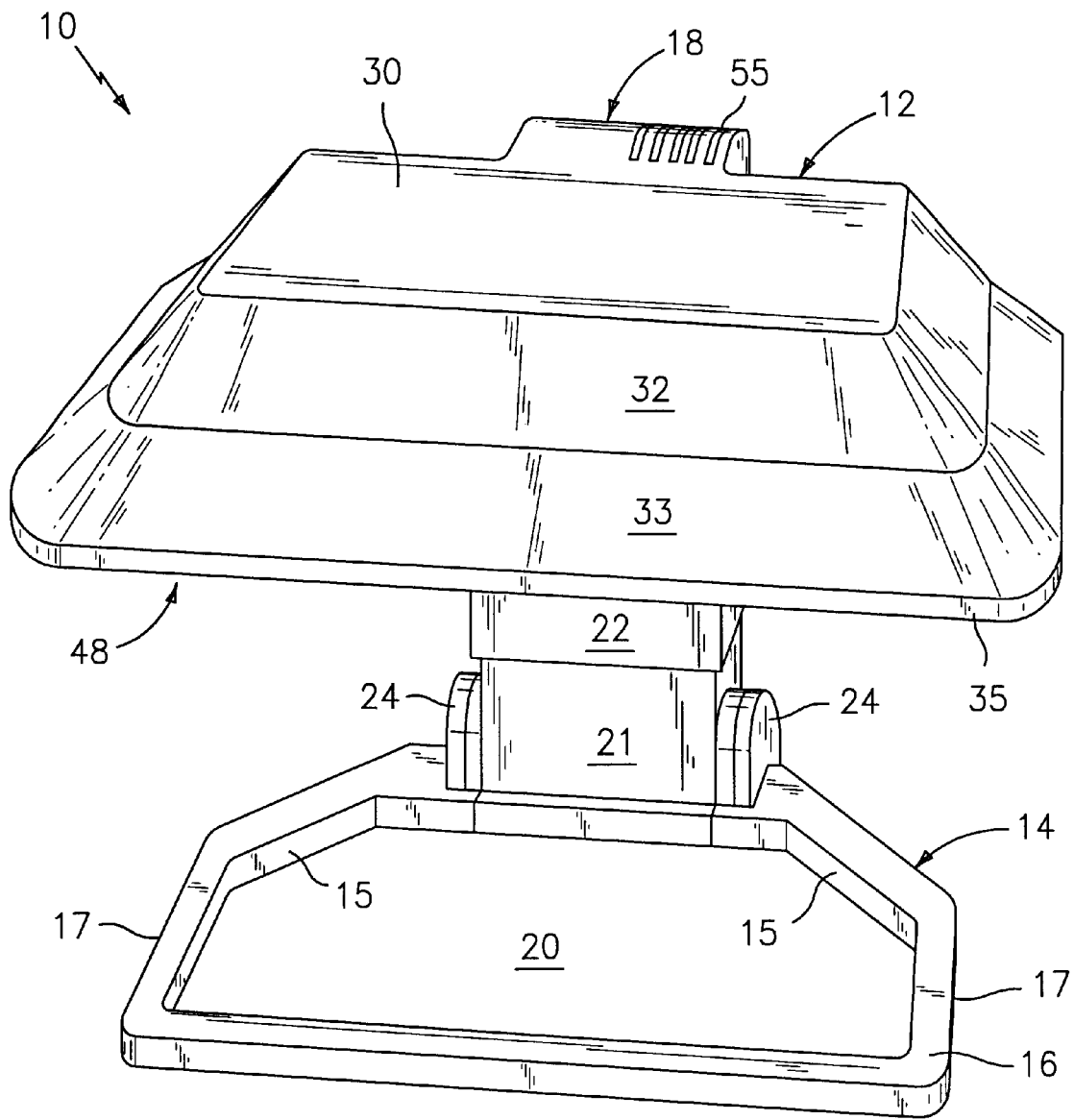
FIG. 1 is a top, perspective view of a smoke control filter unit according to the present disclosure showing a filter unit in cooking position.

Referring now to the drawings, in which like reference numerals identify similar or identical components throughout several views, there is illustrated a stand-alone filtering apparatus 10 (hereinafter generally referred to as "smoke filter 10") in accordance with the principles of the present disclosure. Smoke filter 10 includes a base 14 and a filter unit 12 which generally reside in opposing parallel relation to one another.

Base 14 is preferably dimensioned to perform a dual function: 1) to support the smoke filter 10 in a substantially upright configuration; and 2) to support a grill plate 200 or rotisserie 100 (See FIGS. 8A and 8B) below the filter unit 12. More particularly and as best seen in FIG. 1, base 14 is generally hexagonal in shape and includes a top surface 16 which has an outer periphery 17 and an inner periphery 15. The inner periphery 15 defines an aperture 20 disposed therethrough which gives base 14 an overall hexagonal frame-like appearance for receiving or seating the grill plate 200 and/or the rotisserie 100 therein such that the grill plate 200 and/or rotisserie 10 are positioned below the filter unit 12.

Figure 2:
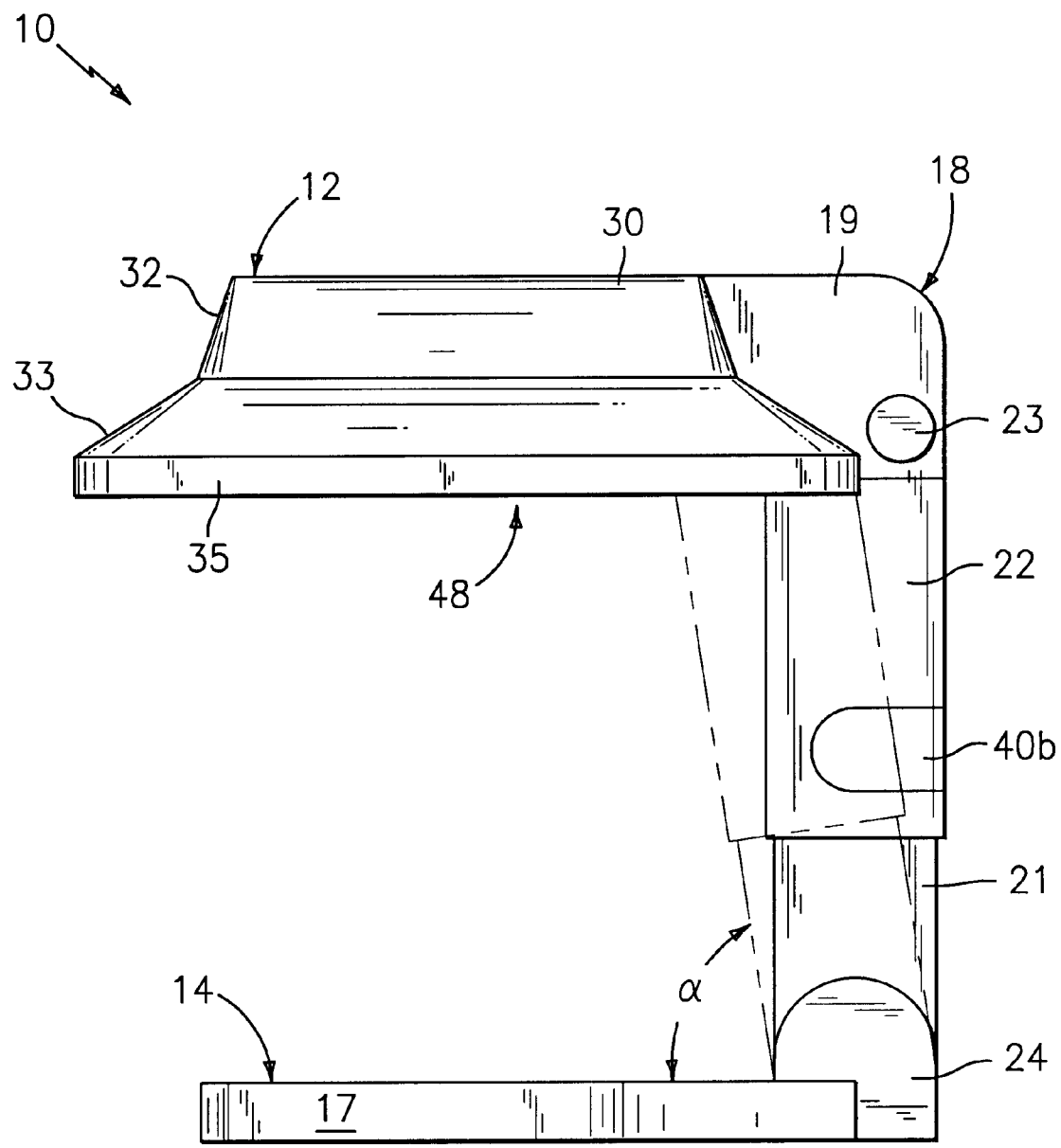
FIG. 2 is a right side view of the smoke control filter unit of FIG. 1 showing angular movement of filter unit in phantom.

As shown best in FIGS. 1 and 2, base 14 also includes a rear post 21 which extends upwardly from base 14. Preferably, the rear post 21 includes a hinge 24 which allows post 21 to pivot at an angle α in relation to base 14. It is envisioned that post 21 may be hollow such that an electrical power source, i.e., cord or battery (not shown) can be channeled therethrough or disposed therein. It is also envisioned that post 21 may include a knob or other mechanical actuator (not shown) which facilitates pivoting and/or securing the post 21 at a desired angle α relative to base 14.

Filter unit 12 includes an intake hood 30 which is preferably divided into two discrete sections, namely, a ventilation housing 32 having a first flared dimension and a lower intake expansion 33 having a larger flared dimension which together define an internal intake chamber 48 (See FIG. 2). Filter unit 12 also includes an outer rim or lip 35 disposed about the outer periphery of lower intake expansion 33 and further defines intake chamber 48. It is envisioned that the intake hood 30 can be of any geometric configuration, preferably having a flare-like appearance, which serves to capture the medium, i.e., smoke and fumes, and contaminants 300 (See FIGS. 8A and 8B) from the cooking surface and direct the smoke, fumes and contaminants 300 into a filtering element 50 disposed within filter unit 12 as described below. For the purposes herein, the term "contaminants" is defined as any natural by-product which may become airborne as a result of grill-style or rotisserie-style cooking, e.g., grease particles, oil splatter, etc.

Figure 4:
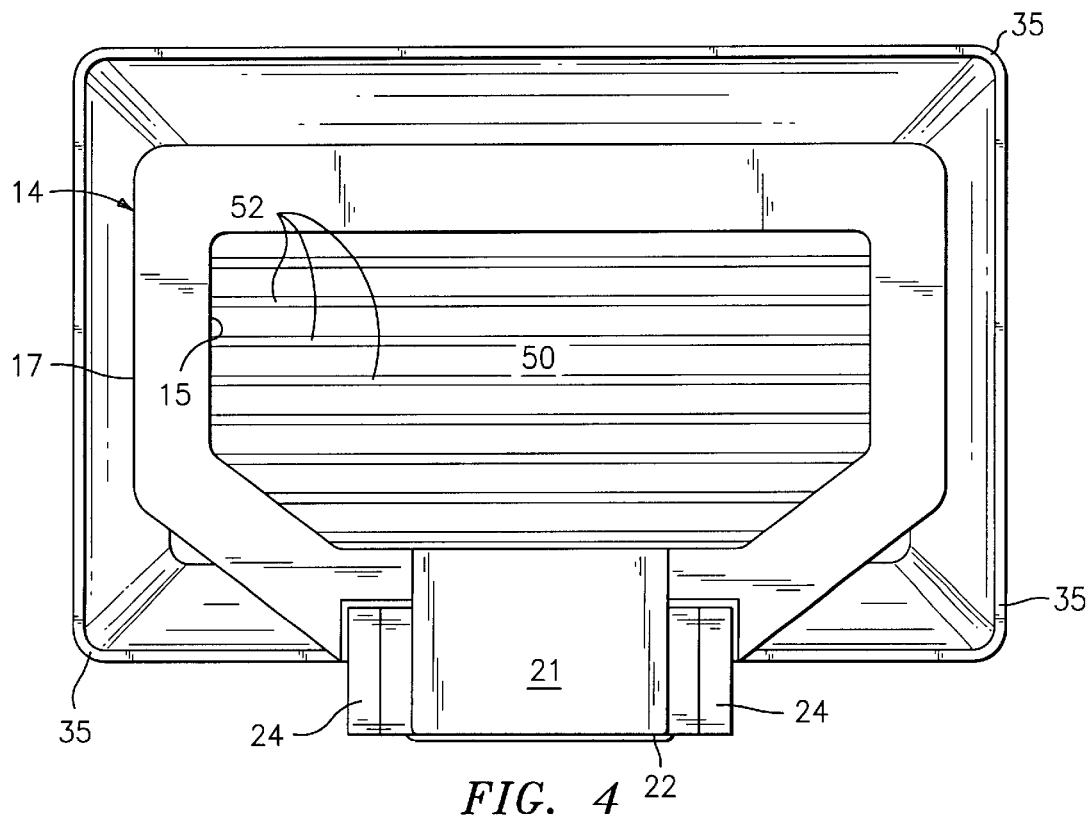
FIG. 4 is a bottom view of the smoke control filter unit of FIG. 1.

As mentioned above and as best shown in FIG. 4, filter unit 12 also includes the filtering element 50 which is disposed within chamber 48 of the ventilation housing 32. Preferably, filtering element 50 includes a plurality of grooves 52 which capture and filter the smoke, fumes and contaminants 300 (See FIGS. 8A and 8B) as the smoke, fumes and contaminants are drawn therethrough as described below. It is envisioned that the filtering element 50 may be selectively removed and/or replaced for cleaning and/or replacement purposes. Further, it is also envisioned that the filter unit 12 may include a variety of different filtering elements 50 which may be easily and quickly interchanged depending upon the type of food being cooked and/or the style of cooking, e.g., grilling or rotisserie. For example, a charcoal-based filtering element 50 may be inserted within chamber 48 to diffuse the smoke, fumes and contaminants 300 resulting from grilling fish.

Figure 3:
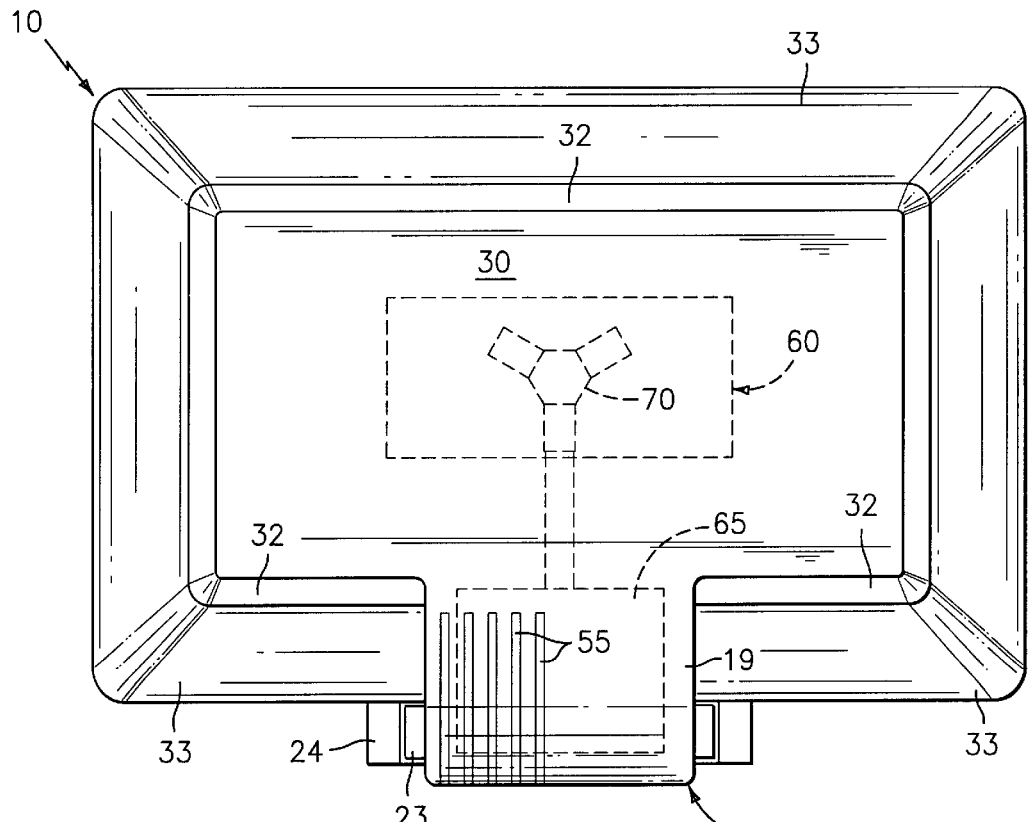
FIG. 3 is a top view of the smoke control filter unit of FIG. 1 with a smoke exhaust fan and a fan motor shown in phantom.
Figure 5:
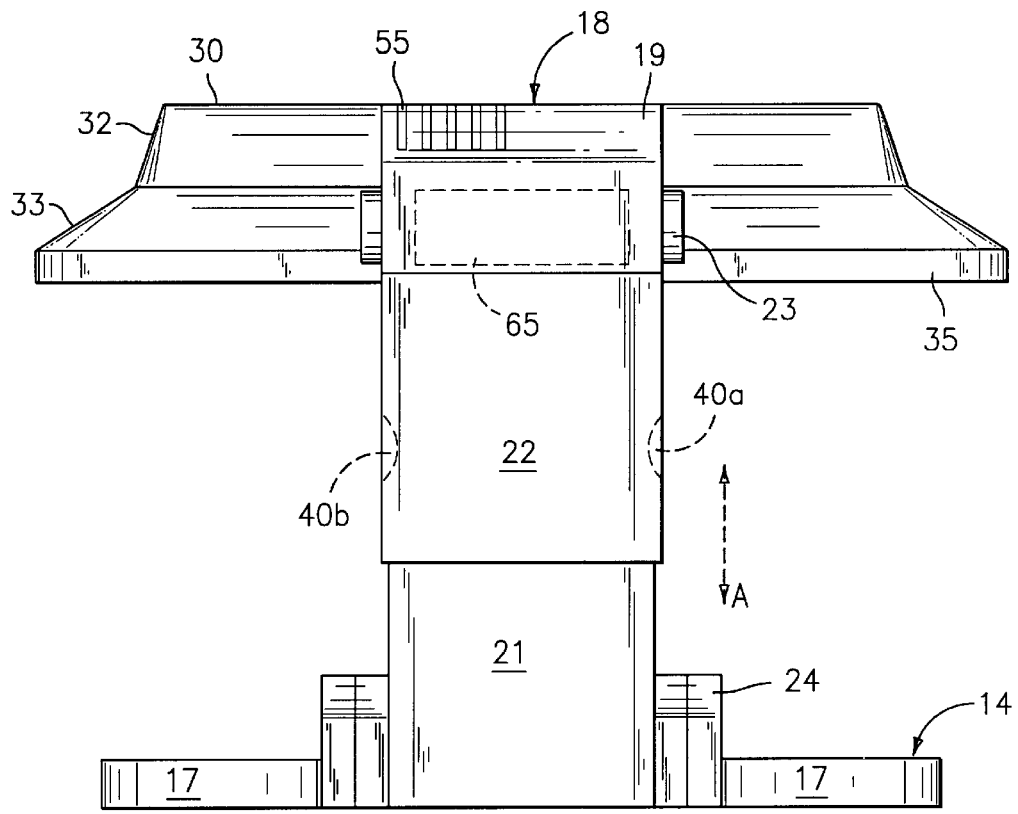
FIG. 5 is a rear view of the smoke control filter unit of FIG. 1 with fan motor shown in phantom.

Filter unit 12 also includes a ventilation system 60 which has a rotating fan 70 and motor 65 (both shown in phantom) disposed within the ventilation housing 32 of intake hood 30 (See FIG. 3). As can be appreciated, fan 70 is rotated so as to create a negative air flow which draws the smoke, fumes and contaminants 300 into and through the filtering element 50. The filtered and decontaminated exhaust is then dispersed through a diffuser 55 disposed on the outside of hood 30. As best shown in FIG. 5, motor 65 may include a switch 23 which adjusts the rotational speed of fan 70 to control the negative airflow through the filtering element 50.

Figure 6:
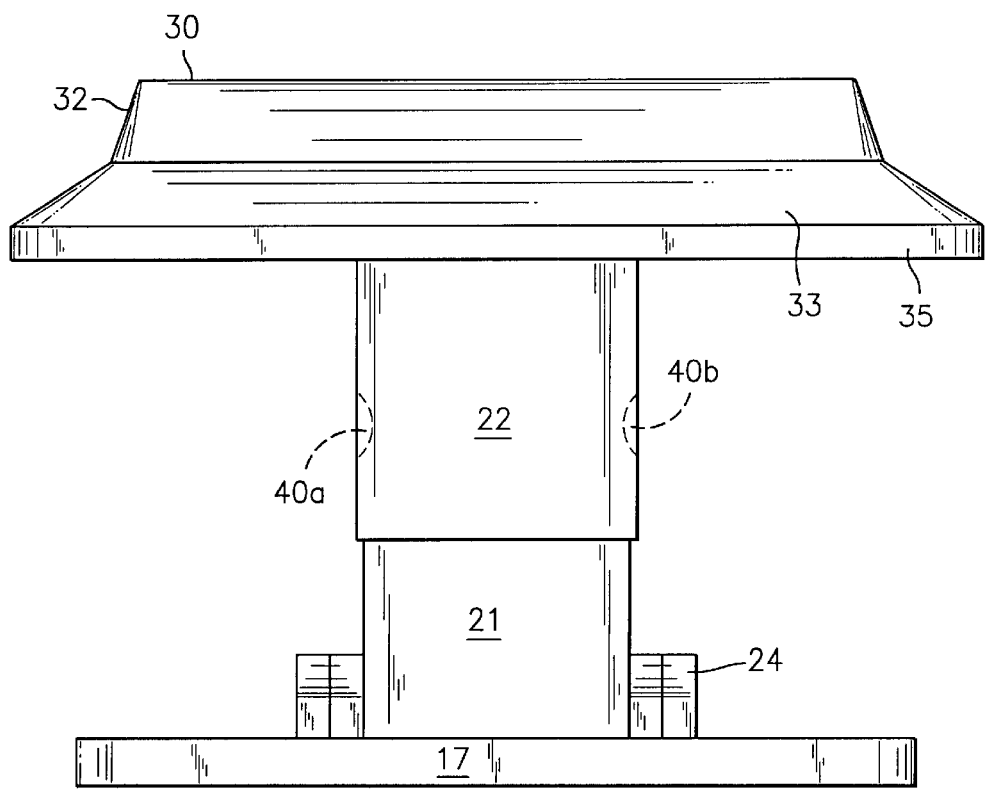
FIG. 6 is a front view of the smoke control filter unit of FIG. 1 with opposing locking tabs shown in phantom.

Filter unit 12 also includes a sleeve 22 which connects to the ventilation housing 32 of hood 30 and extends downwardly therefrom (See FIGS. 2, 5 and 6). Preferably, sleeve 22 is dimensioned for telescopic engagement with post 21 such that the filter unit 12 may be selectively vertically positioned relative to base 14 at various locations along line "A". It is envisioned that the filter unit 12 can readily be raised or lowered for storage purposes or according to the type of cooking style, e.g., grilling (See FIG. 8B) versus rotisserie (See FIG. 8A). Preferably, a pair of opposing locking tabs 40a and 40b may be associated with sleeve 22 and/or post 21 to facilitate movement of the filter unit 12 along line "A". It is envisioned that various mechanical and/or electrical mechanisms may be employed to selectively position and lock the filter unit 12 at desired positions relative to the base 14, e.g., knobs, levers, rack and pinion, etc.

Figure 7:
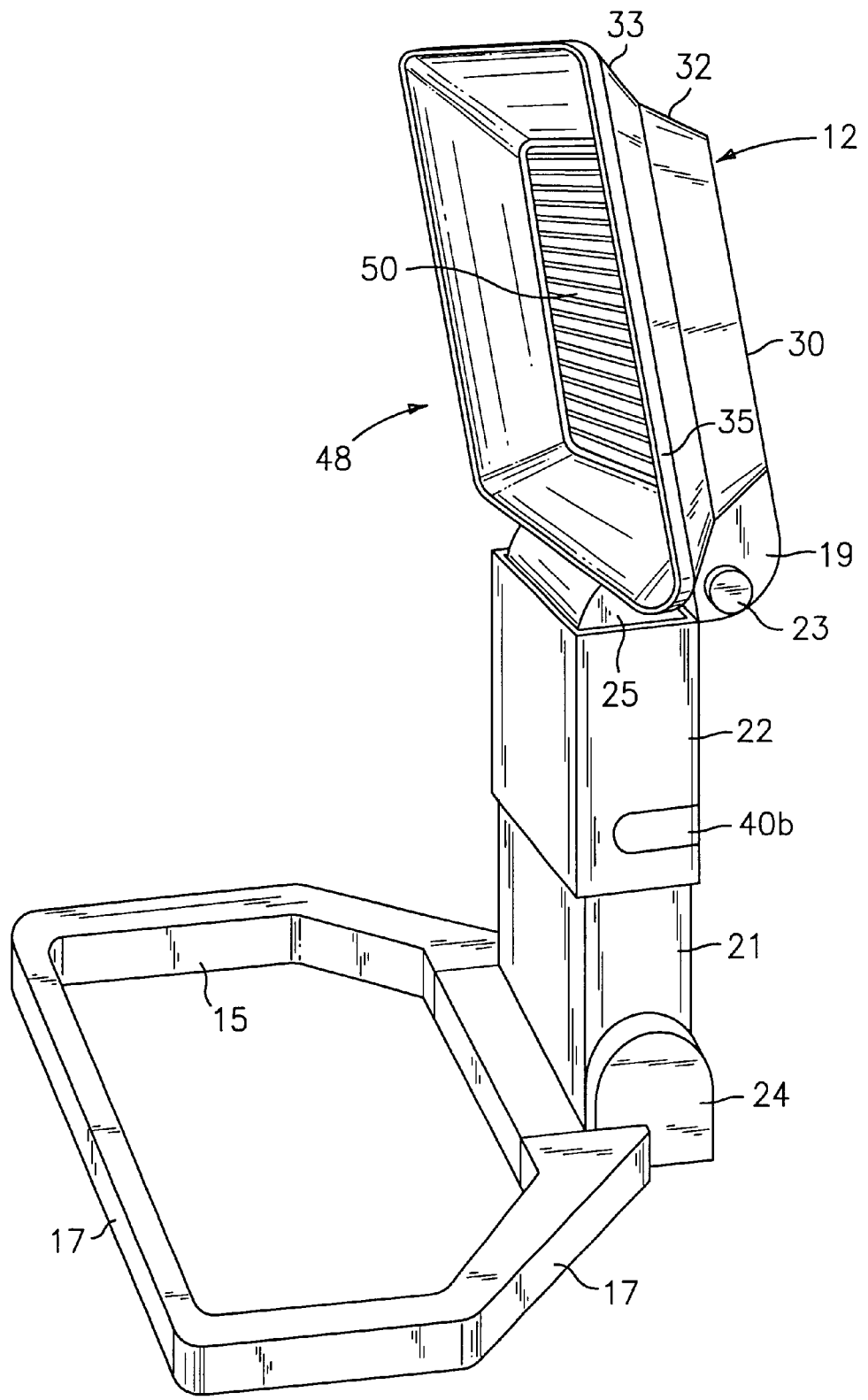
FIG. 7 is a perspective view of the smoke control filter unit of FIG. 1 showing the filter unit in an open position.

As best shown in FIG. 7, filter unit 12 may be connected to sleeve 22 by a hinge 25 which allows the filter unit 12 to be pivoted relative to the base 14. As can be appreciated, the pivotal movement of the filter unit 12 facilitates removal of the filtering element 50 from chamber 48 and also allows the smoke filter 10 to be folded for storage purposes. As mentioned above, base 14 can also be folded against post 21 for storage purposes.

Figure 8A:
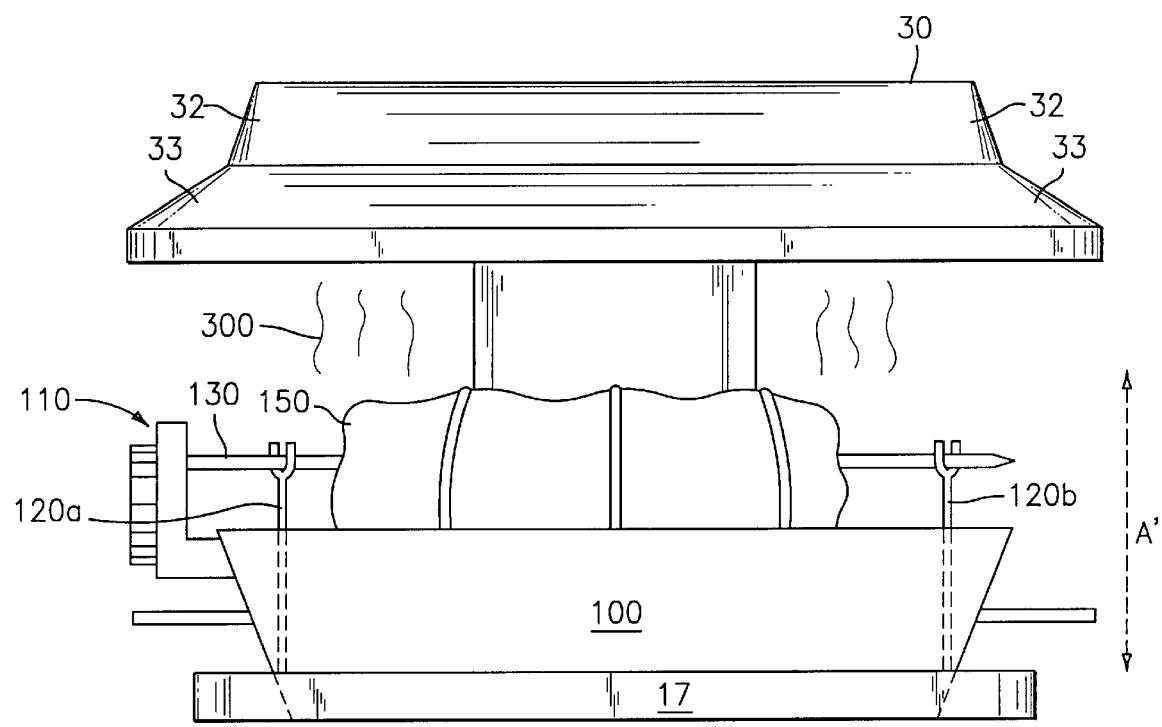
FIG. 8A is a front view of the smoke control unit of FIG. 1 showing the filter unit positioned to accommodate a rotisserie grill.
Figure 8B:
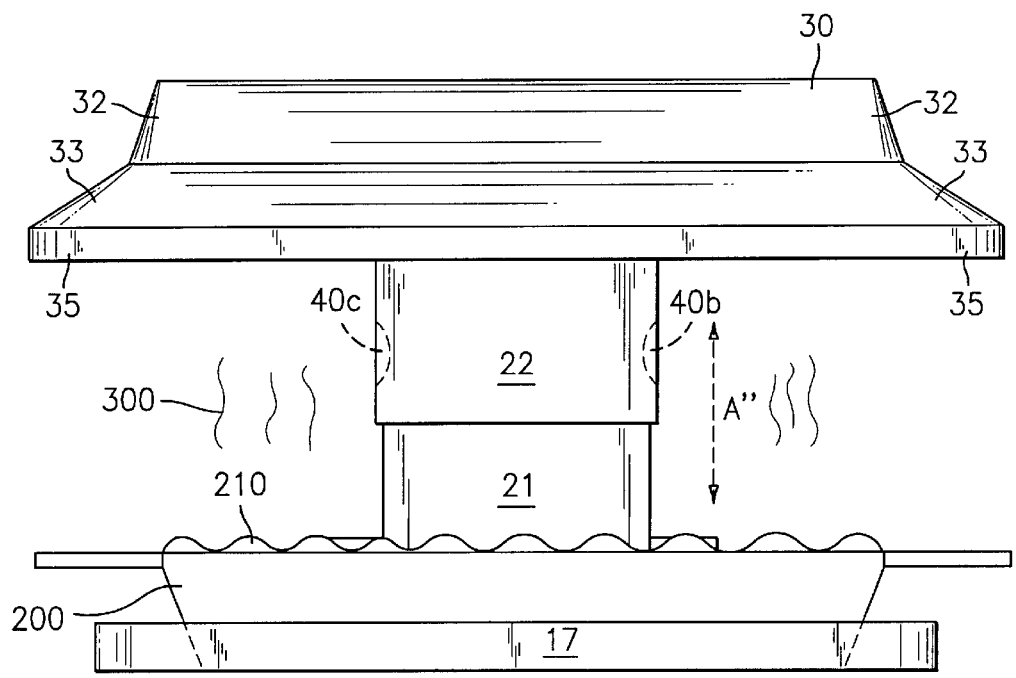
FIG. 8B is a front view of the smoke control unit of FIG. 1 showing the filter unit positioned over a grill plate.

FIGS. 8A and 8B show the smoke filter 10 with the filter unit 12 positioned for two different styles of cooking. More particularly, FIG. 8A shows the filter unit 12 raised to position A' to accommodate the height of the rotisserie unit 100. As can be appreciated, a roast 150 can be placed onto a skewer 130 and positioned directly below filter unit 12 atop cradles 120a and 120b. A rotating mechanism 110 can be actuated to rotate the skewer 130 and the roast 150 over the heating element (not shown) for cooking and the resulting smoke, fumes and contaminants 300 are drawn upwardly into intake hood 30. Thereafter, the smoke, fumes and contaminants 300 are filtered via filtering element 50 prior to being dispersed into the surrounding environment.

FIG. 8B shows the filter unit 12 adjusted to position A" to accommodate for grill-style cooking. More particularly, opposing tabs 40a and 40b are depressed simultaneously to lower sleeve 22 along post 21 to position A". Release of opposing tabs 40a and 40b lock filter unit 12 at position A" above grill plate 200. Thereafter, grill plate 200 is heated via gas or electricity and the food is placed atop grill surface 210. As fat drips from grill surface 210 onto the heating element (not shown) the resulting smoke, fumes and contaminants 300 are drawn upwardly into intake hood 30 and through filtering element 50 as described above.

From the foregoing and with reference to the various drawings, those skilled in the art will appreciate that certain modifications may be made to the present disclosure without departing from the scope of the same. For example, it is contemplated that aperture 20 may be dimensioned in a variety of different geometric shapes and sizes which will accommodate a wide variety of different cooking appliances, e.g., frying pans, roaster pans, woks, steamers, rotisseries, baking trays, etc. It is also contemplated aperture 20 may be dimensioned to seat a specific grill or rotisserie which is sold or specifically manufactured for use with the smoke filter 10. Also, base 14 may be open at the front end so that it assumes a three-sided configuration whereby side "legs" are provided to slide under or around the various cooking appliances.

Although the drawings do not show a specific electrical connection for the ventilation system 60 of the filter unit 12, it is contemplated that the filter unit 12 may be either battery operated, rechargeable and/or require connection to an electrical power source.

There have been described and illustrated herein several embodiments of an indoor smoke filter and while particular embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of preferred embodiments. Those skilled in the art will envision other modifications within the scope and spirit of the claims appended hereto.

What is claimed is:

1. A filtering apparatus for use during indoor cooking, comprising:
    a base configured for the reception of a heating assembly; and
    a filter unit positioned in a plane substantially parallel to a plane in which the base lies, the filter unit being selectively positionable in a vertical direction relative to the plane of the base, the filter unit including:
        a filtering element for removing contaminants from a medium as the medium passes therethrough; and
        a ventilation system for drawing the medium and contaminants through the filtering element.

2. A filtering apparatus according to claim 1 wherein the filter unit includes a hinge which permits pivotable movement of the filter unit relative to the base.

3. A filtering apparatus according to claim 1 wherein the base includes a post which extends therefrom and the filter unit includes a sleeve which telescopically engages the post to allow for selective, vertical positioning of the filter unit relative to the base.

4. A filtering apparatus according to claim 3 wherein the post includes a hinge which allows for pivotable movement of the post relative to the base.

5. A filtering apparatus according to claim 4 wherein the hinge allows the base to fold against the post for storage purposes.

6. A filtering apparatus according to claim 3 wherein the sleeve includes at least one locking tab for selectively positioning and locking the filter unit relative to the base.

7. A filtering apparatus according to claim 1 wherein base includes a support rack having an inner periphery which defines an aperture configured for the reception of the heating assembly.

8. A filtering apparatus according to claim 1 wherein the heating assembly includes a grill plate.

9. A filtering apparatus according to claim 1 wherein the heating assembly includes a rotisserie.

10. A filtering apparatus according to claim 1 wherein the filtering element is removable from the filter unit for cleaning or replacement.

11. A filtering apparatus according to claim 1 wherein the ventilation system includes a motor which operates at least one fan for creating an air flow to draw the medium and contaminants through the filtering element.

12. A filtering apparatus according to claim 11 wherein the motor includes a switch which regulates the speed of the fan and the resulting air flow of the medium and contaminants through the filtering element.

13. A stand-alone filtering apparatus for use during indoor cooking, comprising:
    a base configured for the reception of a heating assembly, the base including a post which extends upwardly from a rear portion of the base; and
    a filter unit positioned in a plane substantially perpendicular to a plane in which the base lies, the filter unit having:
        a filtering element for removing contaminants from a medium as the medium passes therethrough;
        a ventilation system for creating an air flow for drawing the medium and the contaminants through the filtering element; and
        a sleeve which telescopically engages the post of the base for allowing selective vertical positioning of the filter unit relative to the plane of the base.

14. A filtering apparatus according to claim 13 wherein the filter unit includes a hinge which permits pivotable movement of the filter unit relative to the base.

15. A filtering apparatus according to claim 13 wherein the post includes a hinge which permits pivotable movement of the post relative to the base.

16. A filtering apparatus according to claim 13 wherein the filter unit includes a hood having an intake chamber defined therein, the intake chamber being configured for selective reception and engagement of the filtering element therein.

17. A foldable filtering apparatus for use with a cooking device, comprising:
    a base including a support rack having an inner periphery which defines an aperture configured for the reception of the cooking device, the base including a post which extends upwardly from a rear portion of the base; and
    a filter unit positioned in a plane substantially parallel to a plane in which the base lies, the filter unit being selectively positionable in a vertical direction from a first position relative to the plane of the base to a second position further from the base, the filter unit including:
        a hood having an intake chamber defined therein;
        a filtering element for removing contaminants from a medium as the medium passes therethrough, the filtering element configured for selective engagement within the intake chamber;
        a ventilation system for creating an air flow for drawing the medium and contaminants through the filtering element; and
        a hinge which connects the filter unit with the post for permitting pivotable movement of the filter unit relative to the base.

18. A filtering apparatus for use with a cooking device, comprising:
    a base including a support rack having an inner periphery which defines an aperture configured for the reception of the cooking device, the base including a post which extends upwardly from the rear portion of the base; and
    a filter unit which is selectively positionable in a vertical direction from a first position relative to the base to a second position further from the base, the filter unit and base being in substantially parallel planes in said first and second positions, the filter unit including:
        a hood consisting of a ventilation housing, a lower intake expansion and an outer rim for defining an intake chamber therein, which serves to capture contaminants;

a filtering element for removing contaminants from the contaminants as the contaminants pass therethrough, the filtering element configured for selective engagement within the intake chamber;

a ventilation system for creating an air flow for drawing the medium and contaminants through the filtering element; and a hinge which connects the filter unit with the post extending downwardly from the rear portion of the filter unit for permitting pivotable movement of the filter unit relative to the base.

* * * * *